United States Patent [19]

Lapp

[11] Patent Number: 4,771,894
[45] Date of Patent: Sep. 20, 1988

[54] DEVICE FOR SEPARATING MATERIALS OF VALUE FROM A MIXTURE

[75] Inventor: Hans-Günter Lapp, Ratingen, Fed. Rep. of Germany

[73] Assignee: Lindemann Maschinenfabrik GmbH

[21] Appl. No.: 907,507

[22] Filed: Sep. 15, 1986

[30] Foreign Application Priority Data

Sep. 14, 1985 [DE] Fed. Rep. of Germany ....... 8526333

[51] Int. Cl.⁴ .............................................. B07C 9/00
[52] U.S. Cl. .................................... 209/632; 198/770; 209/635; 209/694; 209/700; 209/930
[58] Field of Search ............... 209/691, 694, 700, 707, 209/655, 920, 921, 632, 633, 635, 695, 699, 930, 940; 198/770

[56] References Cited

U.S. PATENT DOCUMENTS

| 2,954,124 | 9/1960 | Young | 209/691 X |
| 3,473,657 | 10/1969 | Graf et al. | 209/694 |
| 3,796,299 | 3/1974 | Musschoot | 198/770 X |
| 3,807,554 | 4/1974 | Sutake | 209/694 |
| 4,143,769 | 3/1979 | Ripple | 209/632 X |
| 4,295,569 | 10/1981 | Niederer | 209/700 X |

FOREIGN PATENT DOCUMENTS

| 875482 | 7/1949 | Fed. Rep. of Germany | 209/671 |
| 1255034 | 11/1967 | Fed. Rep. of Germany | 198/770 |
| 2928886 | 1/1980 | Fed. Rep. of Germany | 209/930 |
| 3305368 | 8/1984 | Fed. Rep. of Germany | 209/700 |
| 127567 | 8/1979 | Japan | 209/691 |
| WO87/04087 | 7/1987 | PCT Int'l Appl. | 209/635 |
| 0828219 | 2/1960 | United Kingdom | 198/770 |
| 1454989 | 11/1976 | United Kingdom | 209/700 |

Primary Examiner—Robert B. Reeves
Assistant Examiner—Edward M. Wacyra
Attorney, Agent, or Firm—Toren, McGeady & Associates

[57] ABSTRACT

A trough-like vibrating conveyor is used to sort and separate two differently shaped components in a mixture of materials of value. The mixture is separated into generally cylindrically shaped parts, such as hollow parts, and generally flat-shaped parts. The conveyor includes at least two unbalanced motors each arranged on an opposite side of the conveyor extending in the conveying direction. Further, the motors are offset relative to one another in the conveying direction. The vibrating conveyor affords a simple operation for separating the differently shaped components of the mixture as the mixture moves between the inlet and outlet ends of the conveyor and particularly for separating any glass particles. The conveyor requires little in the way of technical or personnel expenditure.

6 Claims, 2 Drawing Sheets

DEVICE FOR SEPARATING MATERIALS OF VALUE FROM A MIXTURE

BACKGROUND OF THE INVENTION

The present invention is directed to a device for separating differently shaped materials from a mixture of materials of value, particularly for effecting the separation in a trough-like conveyor where the material is separated into two streams moving in the conveying direction with one stream formed of cylindrically shaped materials and the other stream formed of generally flat-shaped materials.

The recovery of materials of value from waste material, such as industrial waste and particularly domestic waste where the materials of value are mixed in with the waste materials is today not only in general considered as necessary, but also practiced or tried in different ways. The recovery of such materials is at the present time considered necessary and it is carried out or attempted to be carried out in many ways. Different processes have been developed because of locally different conditions and also where environmental factors and capital costs are of great significance.

In the various known processes and devices, one operation deals with the dressing or benefication of so-called mixtures of materials of value where an initial separation is effected so that the mixture is free of any fruit, vegetable or similar kitchen waste, ashes or similar substances. The materials of value are sorted out and collected separately at a waste dump and comprise basically on one hand, glass (preferably undamaged bottles), NF-cans, plastic cans and other containers, and on the other hand, mixed paper products, such as newspapers, magazines, catalogs, brochures along with cardboard as well as foils, metals, textiles, lumber, leather and similar materials, that is, in solid form. In other words, mixtures composed of hollow cylindrically shaped materials and flat materials. Such components are available in a mixture and are collected in the so-called "green barrel."

SUMMARY OF THE INVENTION

Therefore, it is the primary object of the present invention to provide a device for processing such materials of value so that such materials are not reduced in size in view of the considerable disadvantages experienced in known separation plants operating according to the principle of pre-comminution.

The preparation or dressing of uncomminuted materials of value involving a relatively simple method for separating the materials is described and illustrated in the British patent No. 1,573,533, however, such method involves considerable disadvantages which indicates why this process has not been adopted as a practical solution. The mixture of materials of value supplied in the known process is separated depending on the weight of the various materials falling with different velocities onto a sorting band beneath an inlet device. The sorting band slopes upwardly at a considerable incline in the conveying direction, such as at an angle of 40°. Because of the strong impingement accentuated by the location of a baffle plate backing the band surface, the hard components of the mixture of material of value are projected from the band into a collection chute while the paper components adhere to the band and are carried along to its outlet end where they are collected.

This process has been found unsuitable for a clean separation of the mixture components. The impingement considered to be essential for the separating effect is more harmful than useful, since not only is a large portion of the glass components broken into many pieces so that further processing is made difficult, but in addition the heavier harder components impinge with such high energy upon the sorting band and strike the lighter portions which are intended to be conveyed upwardly along the band to the outlet end, however, such lighter portions, such as the paper components, are carried along, at least partially, in the wrong direction.

In accordance with the present invention, a device is provided for sorting and separating a mixture of materials of value into two separate streams so that a simple operating procedure is obtained and a clean separation of the different materials is effected as the mixture moves along the conveyor from an inlet end to an outlet end with the glass components being handled with considerable care and with only minor technical and personnel expenditures.

In accordance with the present invention, a vibrating conveyor is provided with at least two unbalanced motors with each of the motors located along an opposite side of the conveyor trough extending in the conveying direction and with the motors being offset relative to one another in the conveying direction.

The invention proceeds from vibrating conveyor plants previously utilized only for the purpose of transportation and powered by unbalanced motors where the material being transported is given an oblique direction of acceleration to achieve the conveyance of bulk goods. The obliquely directed acceleration is a resultant of the vertical and horizontal acceleration where the vertical acceleration must be greater than the acceleration due to gravity. Such acceleration can be achieved in different ways and is particularly subject to the influence of the projection angle of the motion transmitting means engaging the vibrating conveyor, as well as by the vibrating frequency per minute and the amplitude. In the article "Conveyance of Goods in Vibrating Conveyor Plants with Unbalanced Motor Drive" from "German Hoisting- and Conveying Technology", Vol. 3, 1961, it has been known to arrange two unbalanced motors at a conveying trough or a conveying pipe in a vibrating conveyor plant, if larger outputs are required or if the conveying path is very long. The unbalanced motors located opposite one another along the sides of the conveying trough synchronize themselves in a constrained manner if they have opposing directions of rotation and the plant has at least two degrees of freedom. This last feature is assured, since the conveyor trough is usually mounted at four points either on springs or is suspended elastically.

With the experience gained from the movement of goods transported in vibrating conveyor plants, in the present invention the unbalanced motors are not aligned opposite one another but are offset relative to one another in the conveying direction whereby a complete separating sequence of motion results in a different transport path for flat materials as compared to cylindrically shaped bodies whereby two different paths or streams of the materials of value are established along the conveyor path.

Advantageously, the unbalanced motors are arranged so that the motor along the side of the conveyor forming the cylindrically shaped component path is offset in the conveying direction as compared to the motor associated with the side of the conveyor along which the flat material is conveyed. This effect is attained in a vibrating conveyor with an unbalanced motor on each of the sides of the conveyor trough extending in the conveying direction with the unbalanced motors being offset to such an extent that the path of the flat material from the inlet end to the outlet end of the conveyor extends essentially perpendicularly to a straight line connecting the centers of gravity of the two motors. This relationship is preferred as compared to a straight line intersecting the centers of the axes of the motors for determining the amount of offset, because the location of unbalance is taken into account as an assumed criterion.

The flat materials resting in the bottom of the conveyor trough have an area contact and, therefore, a greater frictional effect causing the movement of such material along the conveyor. The surface contact of the flat material differs basically from the linear contact of the cylindrically shaped bodies or components which is effective from the inlet end to the outlet end of the conveyor within the effective range of the unbalanced motor along the side of the trough toward which the flat material is directed. The unbalanced motor on the side of the trough along which the flat material is conveyed is positioned closer to the inlet end. Depending on whether the flat-shaped components are introduced on the left side or the right side into the trough, they tend to migrate to a lesser or greater degree in the direction of one of the sides of the conveyor trough extending in the conveying direction, while the cylindrically shaped bodies subject to a lesser friction force move toward the opposite side of the trough extending in the conveying direction, that is, the cylindrically shaped material conveying side.

The movement of the flat-shaped components toward one side of the conveying trough and the separation from the cylindrically shaped components can be assisted by sloping the bottom of the conveyor trough downwardly toward the cylindrically shaped material conveying side. While the flat-shaped material adheres to the bottom of the conveying trough in spite of its slope, because of the more favorable friction effect, the friction effect acting on the cylindrically shaped material is much less and the cylindrically shaped material overcomes the friction forces due to the effect of gravity and moves along the slope of the bottom of the conveyor to the lower side, that is, the side of the conveyor trough with the unbalanced motor offset in the conveying direction relative to the motor on the opposite side or, in other words, toward the side of the trough forming the path for the cylindrically shaped components. The movement of the flat-shaped material toward the desired side of the conveyor trough can be increased by providing a different unbalancing of the motors. A lesser unbalance of the motor along the side of the conveyor where the flat-shaped material is conveyed improves the separation of the materials.

In a preferred embodiment, at least the bottom of the conveyor trough is lined with an anti-skid and dampening material. A thick rubber layer of about 10 mm and also possibly extending along the inner side walls of the conveyor trough is suitable. Such a rubber layer not only dampens noise during the conveyance of glass and metallic cans, but it also improves the contact of the flat-shaped material with the conveyor.

If a screen-like grate, such as a grate formed of rods, is provided at the outlet end of the conveyor trough, it is possible to remove any fines not previously screened out. Further, the different streams of material are separated from such smaller particles which may be generated by attrition during the conveying operation or produced by the breakage of glass.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
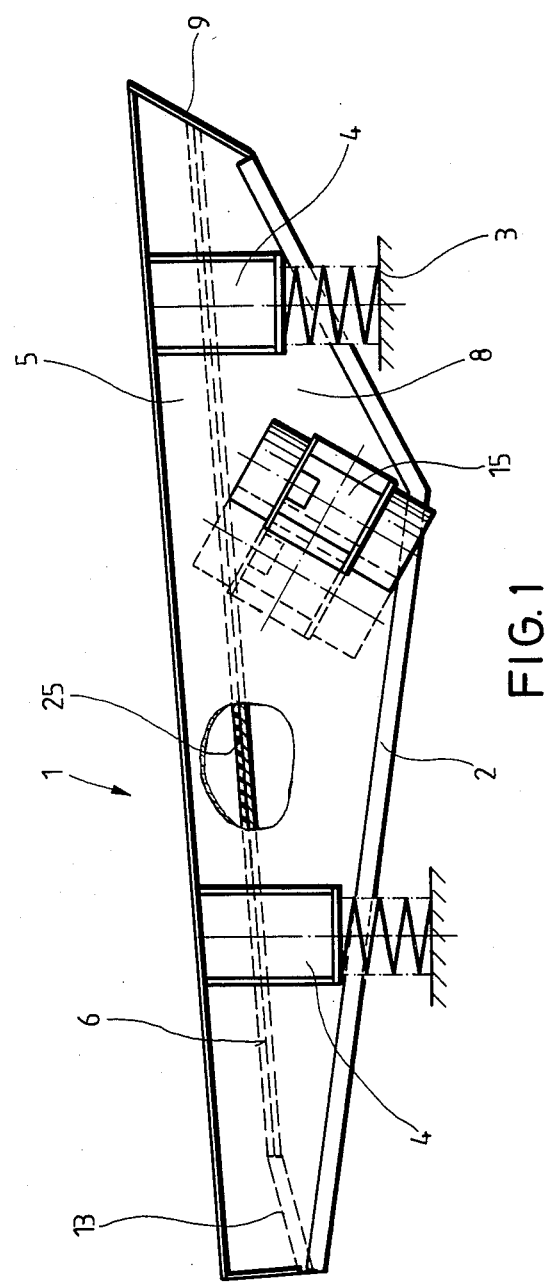
FIG. 1 is a schematic side view of a vibrating conveyor embodying the present invention.

In the drawing a vibrating conveyor 1 is shown supported on springs attached to its base frame 2 and to a foundation 3. The spring support is provided by four rubber vibration bumpers 4 arranged in spaced relation. The conveyor 1 has a rectangular conveyor trough 5 formed by a bottom 6 and side walls 7, 8 extending in the conveying direction and an end wall 9 at the inlet end of the conveyor. End wall 9 closes the trough at the inlet end where a mixture of materials of value made up of flat-shaped materials 10 and cylindrically shaped hollow materials 11 is introduced. The mixture of materials is directed downwardly by a metering device, not shown, onto the conveyor and the materials are prevented from falling out of the conveyor trough 5 by the end wall 9 and the side walls 7, 8. At its outlet end 12, the conveyor trough 5 is open and the bottom of the trough ends in a rod grate 13 which acts as a screen so that the flat-shaped materials 10 as well as the cylindrically shaped materials 11 can drop from the outlet end of the conveyor trough 5 into collection chambers, not shown, while any fines or particles, such as broken glass in the mixture in both of the flow paths are removed as the material passes over the rod grate 13. Unbalanced motors 14, 15 are mounted on the conveyor and serve to transport the mixture through the conveyor trough. One motor 14 is located along the side wall 7 while the other motor 15 is positioned along the side wall 8.

Figure 2:
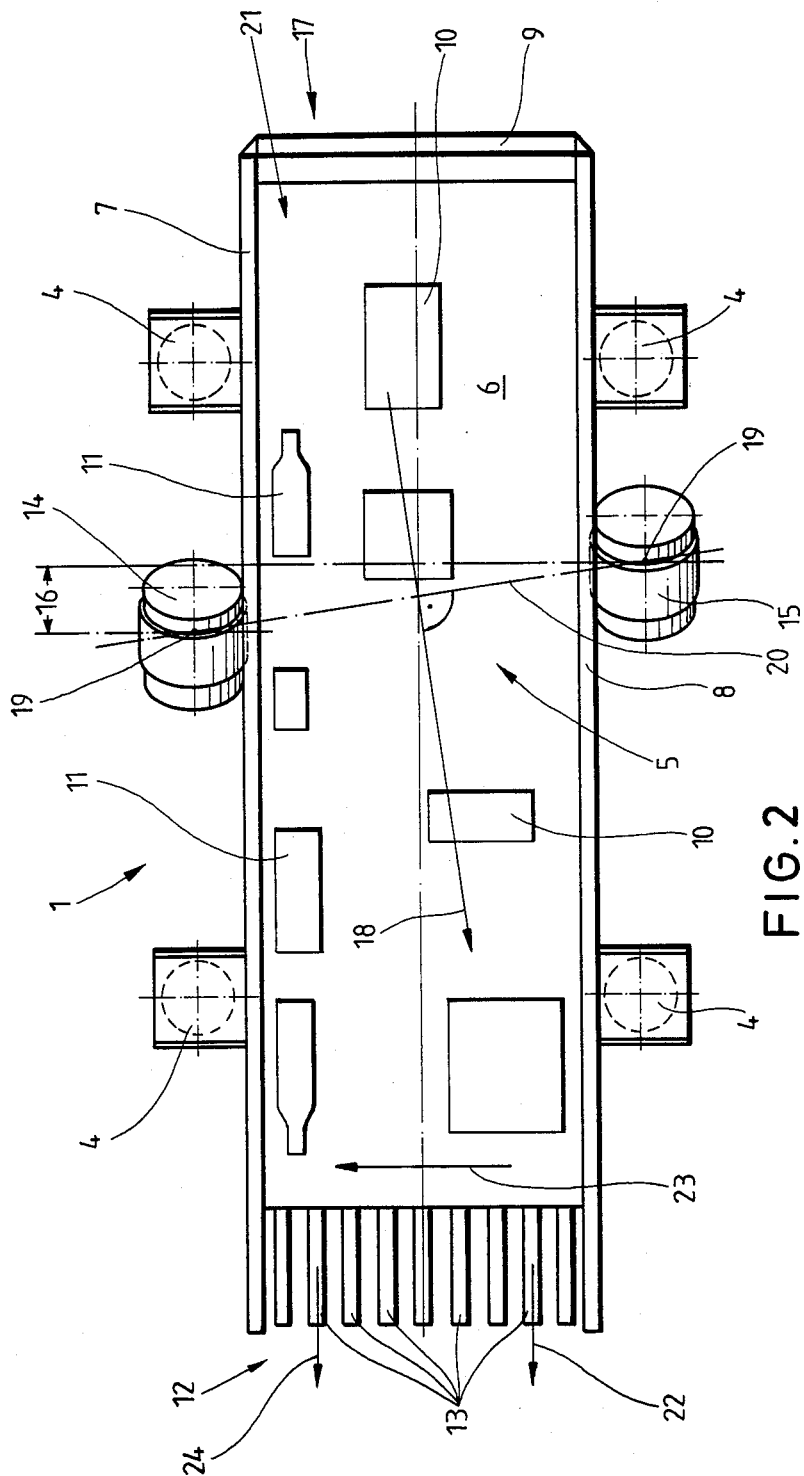
FIG. 2 is a plan view of the conveyor illustrated in FIG. 1.

As shown in FIG. 2, the unbalanced motors 14, 15 are offset relative to one another in the conveying direction indicated by the arrow 17 by a dimension 16 so that the vibration developed by the motors conveying the two flow paths of the material generally in the direction of the arrow 17 results in a conveying vector 18 corresponding to the path of movement of the flat-shaped materials. The vector 18 extends essentially at right angles to a straight line 20 connecting the centers of gravity 19 of the unbalanced motors 14, 15. The offset dimension 16 is a function of the width and the length of the conveyor trough and is selected so that even flat-shaped material 10 introduced onto the conveyor bottom at the side 21 of the inlet end moves to the opposite side of the trough so that it exits at the outlet end in the direction of the arrow 22 along the side characterized as the flat-shaped material conveying side. The flat-shaped material flow is free of any cylindrically shaped material. The effect of the vibration upon the material flow, caused by the offset of the motors relative to one another, for separating the flat-shaped members from the cylindrically shaped members is influenced by providing the motor 15 closer to the inlet end and located along the side wall 8 with a smaller unbalance than the motor 14 positioned along the other side of the trough. In addition, the separation can be enhanced by inclining the bottom 6 of the conveyor trough 5 inclined downwardly in the direction of the arrow 23, that is, sloping downwardly toward the side wall 7 along which the unbalanced motor 14 is located so that the cylindrically shaped members move toward the side wall 7, that is, the side along which the cylindrically shaped members pass, note the arrow 24 indicating the flow path of the cylindrically shaped members. Utilizing these features individually or in combination, the cylindrically shaped members move to the lower side of the conveyor trough along the side wall 7 where such materials are prevented from falling off the conveyor by the side wall 7 and thus pass in the direction of the arrow 24 off the conveyor separate from the flow path of the flat-shaped materials 10 along the side wall 8.

Due to the interaction inherent in the system during the movement of the material, the friction phenomena affecting the flat-shaped material 10 and the cylindrically shaped material 11 are influenced in a differing manner. The friction between the cylindrically shaped members and the conveyor surface is such that the cylindrically shaped materials move to the side wall 7 of the conveyor. On the other hand, the friction between the flat-shaped materials and the conveyor surface is so great that the flat-shaped materials adhere to the bottom of the trough and move in the direction of the conveying vector 18 away from the side wall 7 toward the side wall 8 moving in the direction of the arrow 22. The friction effect required for the flat-shaped material can be improved by lining at least the bottom 6 of the conveyor trough with an anti-skid material 25, note FIG. 1, such as rubber which also affords a dampening of noise during the conveying movement.

The cylindrically shaped members 11 move toward the side wall 7 of the conveyor trough 5 along which the motor 14 is located further from the end wall 9 at the inlet end where the mixture of material is directed onto the conveyor. In case the arrangement of the motors 14 and 15 is changed from the illustrated arrangement, the cylindrically shaped members could move toward and along the side wall 8 while the flat-shaped material 10 could move toward and along the side wall 7.

While specific embodiments of the invention have been shown and described in detail to illustrate the application of the inventive principles, it will be understood that the invention may be embodied otherwise without departing from such principles.

I claim:

1. Device for the separation of differently shaped materials in a mixture of materials of value comprising a trough-like conveyor for the separation of the mixture into two parts with each part moving along a separate path on said conveyor with a first part formed of cylindrically shaped material and a second part formed of generally flat material, said trough-like conveyor comprising an elongated conveyor trough having an inlet at one end and an outlet at the other end spaced from the inlet in the elongated direction thereof and a first and a second elongated sides extending between said inlet and said outlet and spaced laterally apart and a bottom surface extending between said first and second sides and between said inlet and outlet ends, a vibrating conveyor forming said bottom surface, at least two unbalanced motors located on said conveyor, one of said at least two unbalanced motors is located on said first side and the other of said at least two unbalanced motors is located on said second side and the one of said at least two unbalanced motors being offset in the elongated direction from the other of said at least two unbalanced motors and spaced closer to said outlet end, said bottom surface is inclined downwardly from said second side toward said first side, said unbalanced motors transmit vibration to said conveyor in the bottom surface of said conveyor trough for moving the material from the inlet end to the outlet end and the vibration transmitted by said at least two unbalanced motors in combination with sloped bottom surface effects the movement of the cylindrically shaped material toward and along said first side and the movement of the flat-shaped material toward and along the second side so that the differently shaped materials exiting from the outlet end of said trough conveyor are located in separate paths at said first side and said second side at said outlet.

2. Device, as set forth in claim 1, wherein each of said at least two unbalanced motors has a different degree of unbalance.

3. Device, as set forth in claim 1, wherein the bottom surface of said trough-like conveyor is lined with an anti-skid and damping material.

4. Device, as set forth in claim 1, wherein said conveyor has a screen-like grate located adjacent the outlet end for effecting the separation of fines and small particles from the material exiting from said conveyor.

5. Device, as set forth in claim 4, wherein said trough-like conveyor is inclined downwardly from the inlet end to the outlet end thereof.

6. Device, as set forth in claim 1, wherein said conveyor is spring mounted at spaced locations in the elongated direction thereof.

* * * * *